United States Patent [19]

Tucker

[11] Patent Number: 5,370,414
[45] Date of Patent: Dec. 6, 1994

[54] LOW PROFILE STEERABLE DOLLY TRAILER

[76] Inventor: Charles B. Tucker, P.O. Box 492810, Leesburg, Fla. 34748

[21] Appl. No.: 69,361

[22] Filed: Jun. 1, 1993

[51] Int. Cl.$^5$ ........................................... B62D 59/04
[52] U.S. Cl. ................................. 280/404; 280/476.1
[58] Field of Search ................... 280/404, 405.1, 406.1, 280/407, 407.1, 476.1

[56] References Cited

U.S. PATENT DOCUMENTS

| | | | |
|---|---|---|---|
| 2,772,892 | 12/1956 | Hake et al. | 280/407.1 |
| 2,776,846 | 1/1957 | Willock | 280/407 |
| 4,762,192 | 8/1988 | Maxwell | 280/404 |

*Primary Examiner*—Mitchell J. Hill
*Assistant Examiner*—Victor E. Johnson
*Attorney, Agent, or Firm*—Steven C. Stewart; James H. Beusse

[57] ABSTRACT

A low profile dolly trailer pulled by a cab trailer for hauling large concrete, steel trusses and other material masses. The trailer includes a first frame and second frame. The first frame is supported at one end by the cab trailer and at its other end with an axle assembly. The second frame is pivotally connected adjacent one end to the first frame between the axle assembly and the first trailer, and is connected to a second trailer at its other end. The axle assembly has a wheeled axle that extends through an opening in the second frame to reduce the dolly trailer's profile.

20 Claims, 4 Drawing Sheets

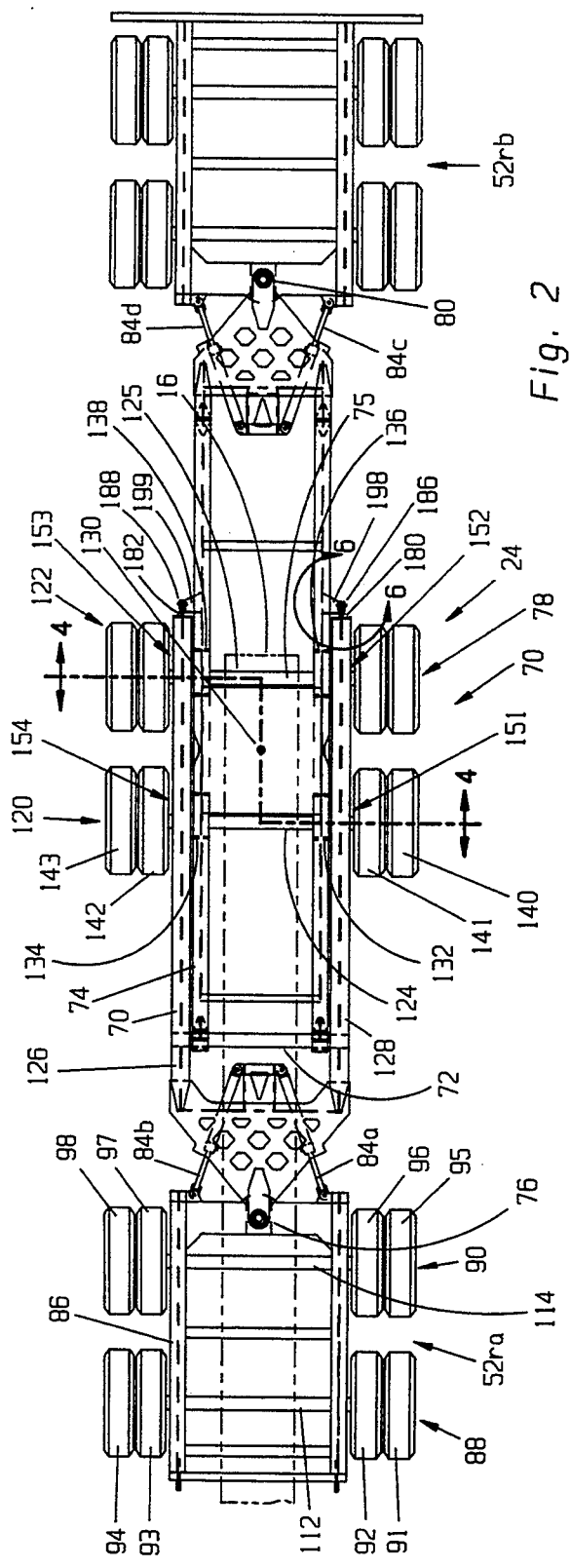
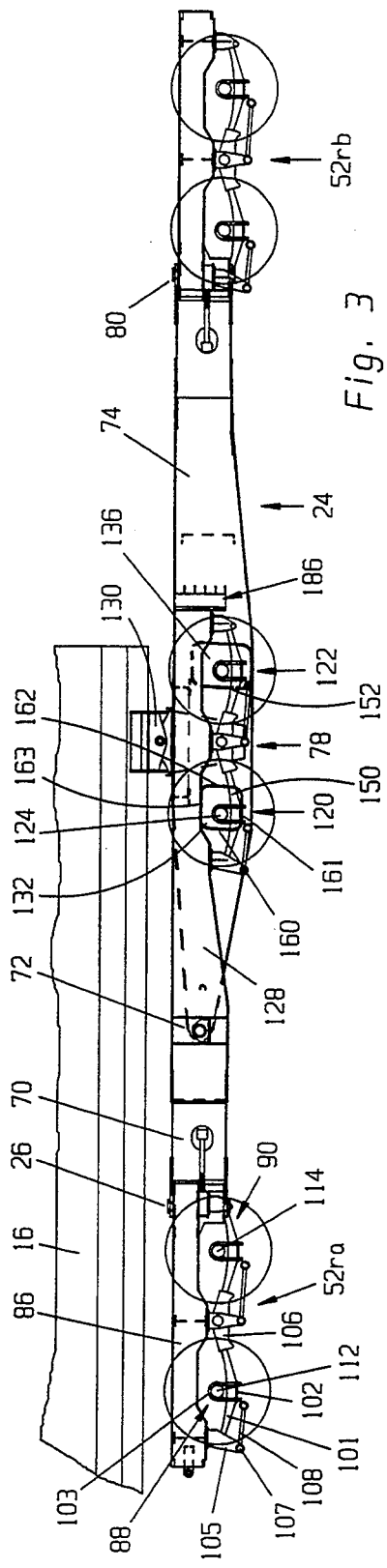

LOW PROFILE STEERABLE DOLLY TRAILER

BACKGROUND OF THE INVENTION

This invention relates to vehicles for hauling large objects such as beams, trusses, material masses and the like and more particularly, relates to a steerable low profile dolly trailer that transports a material mass at a level close to the ground.

Dolly trailers are the vehicle of choice for transporting heavy concrete or steel beams, as they widely distribute the beams' load over the roads. Typical dolly trailers have a front assembly which supports the front portion of the beam and a rear assembly which supports the rear portion of the beams. The front and rear assemblies have an elevated frame with a first elevated end which rests on a trailer and a second non-elevated end that includes a wheeled axle assembly. Bolsters are placed on the elevated ends to support the beam.

These dolly trailers transport beams over long distances. A drawback to prior dolly trailers is the elevated frame raises the level of the beam being transported. Consequently, the elevated beam has a tendency to wobble and turn over during the hauling operations. Further, the raised beam may not have the clearance to pass under some low lying obstacle bridges, thereby impeding the beams' path and forcing the dolly trailer to detour around the obstacle.

SUMMARY OF THE INVENTION

An object of this invention is to provide an improved doily for transporting large material masses.

Another object of .this invention is to transport trusses, beams and other objects with reduced wobble and greater stability.

A further object of this invention is to haul beams at a level closer to the ground to permit the beams to pass under low lying obstacles.

These and other objects are provided with a low profile dolly trailer having an elongated first frame supported adjacent one end with a first trailer and supported adjacent its other end with an axle assembly. A second elongated frame is pivotally connected adjacent one end to the first frame between the axle assembly and the first trailer. The second frame is supported about its other end with a second trailer. The axle assembly has a first wheeled axle that extends through an opening in the second frame so that the second frame can pivot about the first frame while maintaining a low profile. Preferably, the opening is shaped to allow the wheeled axle to move vertically to permit the second frame to pivot vertically about the first frame under varying road conditions.

DESCRIPTION OF THE FIGURES

FIG. 2 is a top view of the rear dolly trailer assembly shown in FIG. 1.

FIG. 3 is a side view of the rear dolly trailer assembly shown in FIG. 2.

DESCRIPTION OF THE PREFERRED EMBODIMENT

Figure 5:
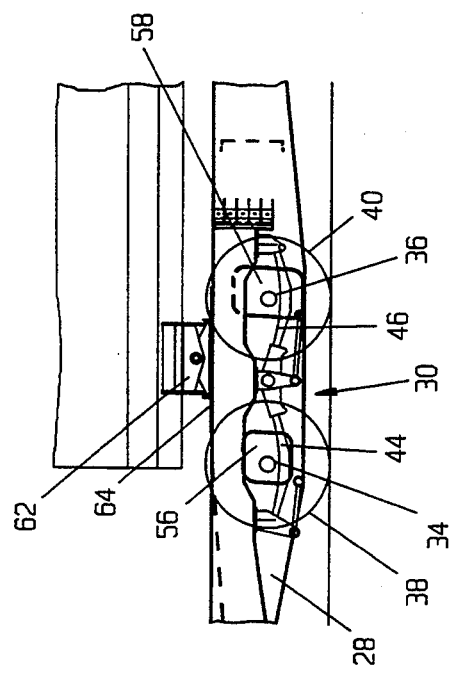
FIG. 5 is an enlarged side view of the front dolly axle assembly shown in FIG. 1 along line 5—5.
Figure 1:
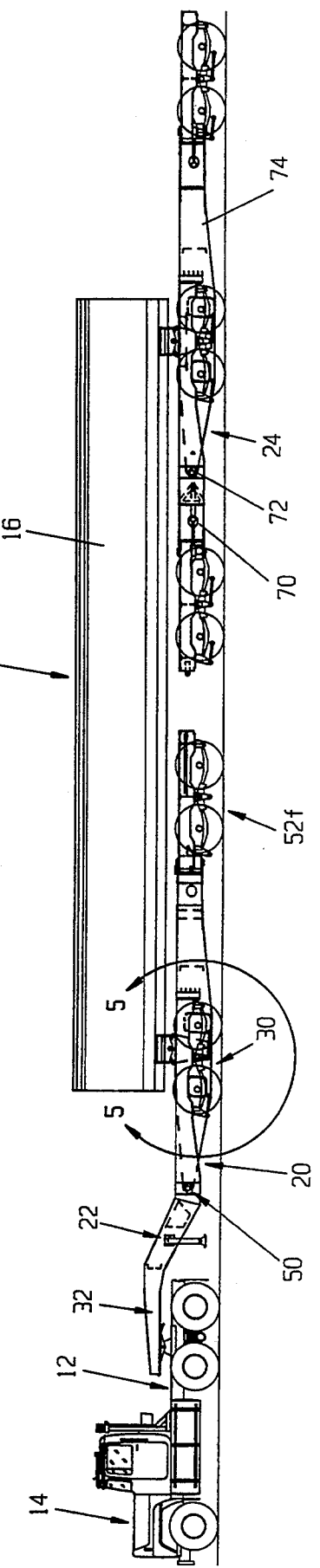
FIG. 1 is a side perspective view of the low profile dolly trailer assembly being pulled by a cab and hauling a beam in accordance with the invention.

Referring to FIG. 1, there is shown a dolly trailer assembly 10 attached to a cab trailer 12 of cab 14. Resting on dolly trailer assembly 10 is a beam, truss or object referred to generally herein as material mass 16. Cab 14 pulls dolly trailer assembly 10 and mass 16 along the path of travel of cab 14.

Dolly trailer assembly 10 includes a front low profile steerable dolly trailer 20 attached to cab trailer 12 with first front frame 22. Dolly trailer assembly 10 also has a rear low profile steerable dolly trailer 24 which will be described in more detail herein in connection with FIGS. 2, 3, 4 and 5. Front low profile steerable dolly trailer 20 includes first outside frame 22 pivotally connected to a second inside frame 28. First frame 22 is supported at one end with cab trailer 12 and is supported at its other end with a front dolly axle assembly 30. First front frame 22 is connected at one end to cab trailer 12 with a vertical pin 32 which permits trailer 20 to rotate in a horizontal plane about pin 32.

Front dolly axle assembly 30 includes transversely extending axles 34 and 36 having wheels 38, 40 on one end, respectively, and wheels (not shown) on its other end. Axle 34 and axle 36 support first frame 22 with leaf spring units 44 and 46, respectively, which are connected to the axles, 34 and 36, by conventional tie plates (not shown) with pairs of u-bolts and nuts (not shown). These axles 34 and 36 extend through an opening in second inside frame to permit assembly 30 to form a low profile. More details of the axle assembly 30 will be described later in FIGS. 2-4.

Inside frame 28 is pivotally connected at one end using pin 50 to outer frame 22. The rear end of inside frame 28 is supported by rear trailer assembly 52f. Details of the rear trailer assembly 52f will be described in connection with FIGS. 2-4.

Axles 34 and 36 extend through an opening 56 and 58, respectively, in second front frame 28. An important feature of this invention is that the level of pin 50 is positioned below the top surface of both front frame 22 and second frame 28. This position is possible because axles 34 and 36 extend through openings in second frame 28 while supporting one end of first frame 22. Axles 34 and 36 move freely vertically about second frame 28 in the opening to compensate for different gradients on the road or ground through which dolly trailer assembly 10 travels.

A front bolster 62 rests on a horizontal plate 64 extending over the top surface of second frame 28. Front bolster 62 supports the front portion of material mass 16.

Figure 4:
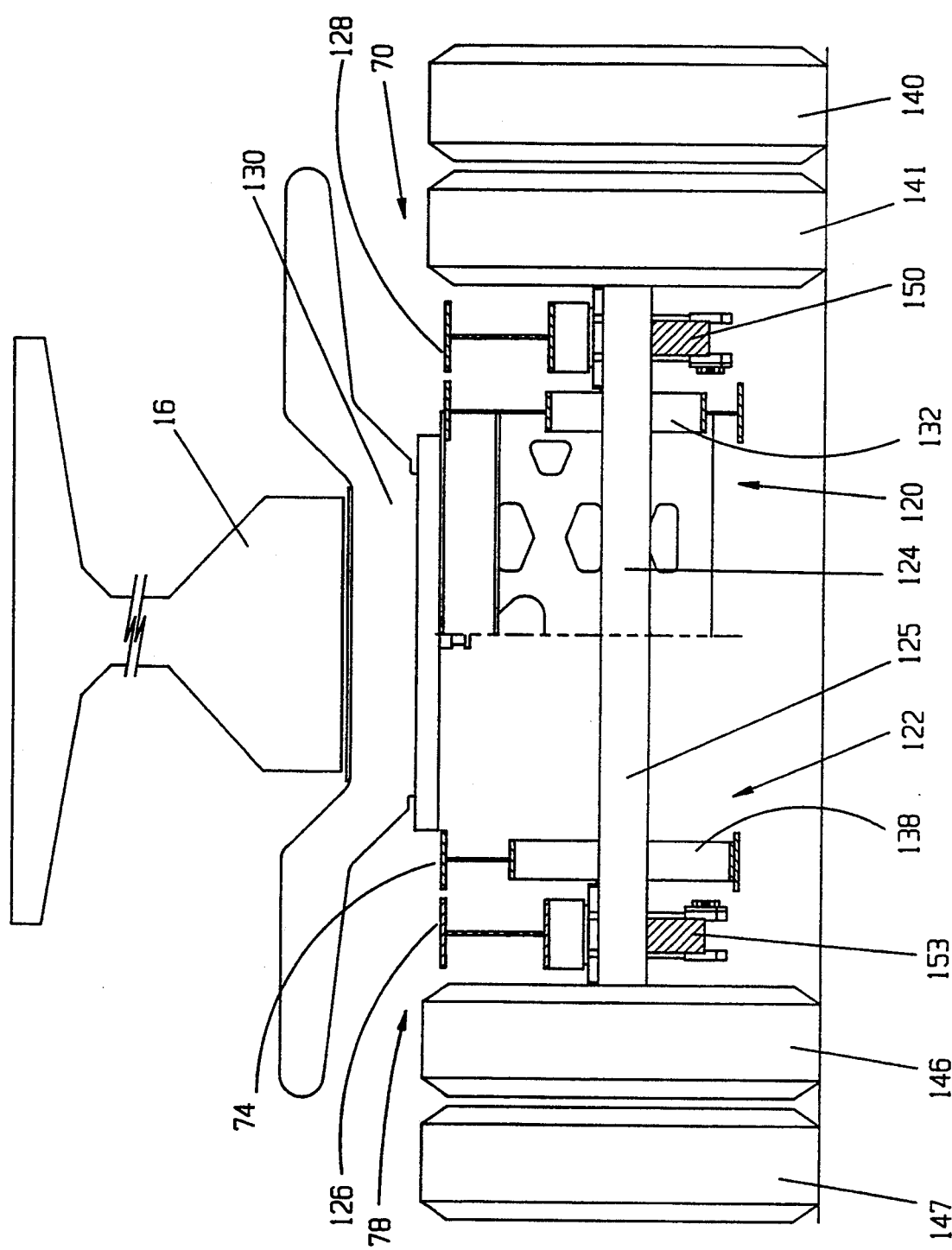
FIG. 4 is a cross section view of the rear dolly trailer assembly shown in FIG. 2 along line 4—4.

Referring to FIGS. 2-4, there is shown rear low profile steerable dolly trailer 24. Dolly trailer 24 includes outer frame 70 pivotally connected with horizontal pin 72 to inner frame 74. Referring to FIGS. 2 and 3, outer frame 70 is pivotally attached at one end to vertical pin 76 extending into rear trailer assembly 52ra. The other end of outer frame 70 is supported by mid-axle assembly 78. One end of frame 74 is supported with pin 72 and the other end is supported by rear trailer assembly 52rb. The rear end of inner frame 74 is connected with vertical pin 80 to rear trailer assembly 52rb.

Mid-axle assembly 78 rotates radially about pin 76 and pin 80 when dolly trailer assembly 10 moves along a curve of a road. Mid-axle assembly 78 is also connected to rear trailer assembly 52ra with hydraulic cylinders 84a and 84b, and is connected to rear trailer assembly 52rb with hydraulic cylinders 82c and 82d. These cylinders 82a–82d control the rotation of axle assembly 78 about pins 76 and 80.

Rear trailer assemblies 52f, 52ra and 52rb are similarly constructed. Accordingly, only the details of rear trailer assembly 52ra will be described. Referring to FIGS. 2–3, assembly 52ra includes a frame 86 supported by wheeled axle assemblies 88 and 90 having axles 112 and 114, respectively. Wheeled axle 112 has each of its wheels 91–94 mounted thereto outside of frame 86. Wheeled axle 114 has wheels 95–98 on each end outside of frame 86. Adjacent each end of axles 112 and 114, between wheels 91–98 and frame 86, is a leaf spring unit. More particularly, unit 101 is shown connected to axle 112 by a conventional tie plate 102, a pair of u-bolts 103 and nuts 104.

Wheeled axle assembly 52ra is provided with a front hanger 105 and rear hanger 106 to support the corresponding ends of leaf spring unit 101. A front hanger bolt 107 secures front end of link 108 between the depending legs 105a of the front hanger. Link 108 has its lower ends connected to the center of leaf spring unit by conventional means such as a bolt and nut.

Referring to FIGS. 2–4, mid-axle assembly 78 also includes a pair of axle assemblies 120 and 122. Each of these axle assemblies includes an axle 124 and 125, respectively, having a pair of wheels on each end. Specifically, axle 124 has wheels 140, 141 on one end and wheels 142, 143 on its other end.

Outer frame 70 includes a right side rail 126 and a left side rail 128. Pin 72 extends transversely and parallel to the ground between right side rail 126 left side rail 128, adjacent trailer assembly 52ra. Pin 72 supports one end of inner frame 74 and is positioned at a level below the top surface of inner frame 74 and over frame 70. Right and left side rails 126 and 128, as well as inner frame 74, have top surfaces which are substantially co-planar with each other. Extending across side rails 134 and 136 is plate 75. Frame 74 extends in-between rails 126 and 128. Resting on the top surface of plate 75 is a bolster 130 which supports the rear portion of material mass 16. Bolster 130 is substantially positioned over axles 124 and 125.

Wheeled axle assemblies 120 and 122 are attached to lower surface of left and right side rails with leaf springs 150, 151 and 152, 153, respectively, and a u-bolt mechanism (not shown) as previously described. Inner frame 74 includes opening 132 in left side rail 128 and opening 134 in right side rail 126 through which axle 124 extends and opening 136 in left side rail 128 and opening 138 in right side rail 126 through which axle 125 extends therethrough. Completely surrounding openings 132 and 135 are walls 160–163, and walls 164–167, respectively, allows a deep, strong beam and limits the movement of axle 124 and axle 125.

The connections and mounting arrangements for the leaf springs are positioned so that the axle are preferably positioned about the middle portion of the opening so that axle 124 and axle 126 can travel vertically up and down within the opening. An important advantage to this structure is that the inner frame 74 pivots radially and vertically about pin 72 under varying road conditions thereby providing a low profile dolly assembly 10. Another important aspect of the invention is that pin 72 is positioned at a level below the top surface of both inner frame 74 and outer frame 70.

Referring to FIG. 2, connected to and protruding rearward from rails 70 and 128 are vertical plates 180 and 182 respectively. Guide assemblies 186 and 188 are securely attached to the side of rails 70 and 128 with brackets 198 and 199 respectively. Vertical plates 180 and 182 extend respectively into guide assembly 188 and 190. Vertical plates 180 and 182, and assembly 186 and 190 are identical, and thus plate 180 and assembly 186 will herein be described.

Figure 6:
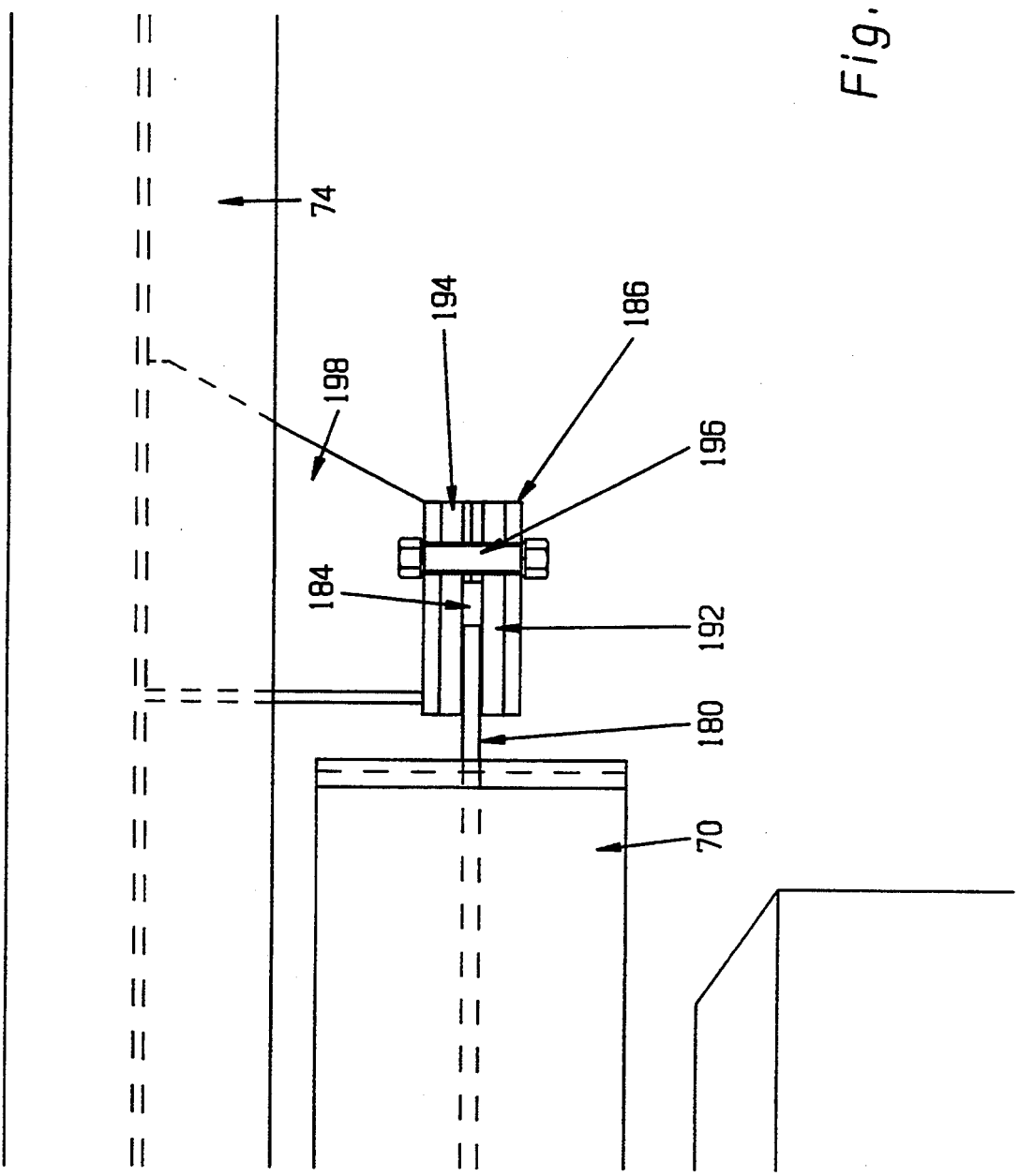
FIG. 6 is a top view of a guide assembly shown in FIG. 2 along line 6—6.

Referring to FIG. 6, vertical plate 180 slidably extends into vertical slot 184 of guide assembly 186 to couple rail 70 to rail 74. The sides of slot 184 are preferably formed by conventional means to permit plate 180 to freely slide up and down in slot 184. Assembly 186 is formed with vertical plates 192 and 194, which are held together with pin 196. Assembly 188 and assembly 186 prevent rails 70 and 128 from flexing inward or outward away from rails 74 and 128 respectively during the travel of axle assembly 78. Assembly 186 and 188 also prevent rails 74 and 128 from turning, shimmying or twisting during travel of axle assembly 78.

This concludes the description of the preferred embodiments. A reading by those skilled in the art will bring to mind various changes without departing from the spirit and scope of the invention. It is intended, however, that the invention only be limited by the following appended claims.

What is claimed is:

1. A low profile dolly trailer adapted to be pulled by a cab, the trailer comprising:
   an outer frame having one and another ends and pivotally connected at said one end thereof to the cab and having a left side rail and a right side rail extending generally parallel from said one end toward said another end thereof;
   an inner frame having one end and pivotally connected adjacent said one end thereof to said another end of said outer frame and extending between said left and right side rails, said inner frame having another end opposite said one end thereof connected to a rear wheel assembly;
   a mid-wheel assembly having an axle with a wheel laterally positioned outside each of said left side and right side rails, said axle supporting said left side and right side rails and extending through at least a partial opening in said inner frame; and
   means mounted on said inner frame over said axle for supporting a material mass.

2. The trailer as recited in claim 1 wherein said inner frame and outer frame have a top surface and wherein the plane of the top surface of said inner frame is substantially co-planar with a top surface of the outer frame.

3. The trailer as recited in claim 1 wherein said opening of said inner frame has side walls, and wherein said side walls completely surround said axle.

4. The trailer as recited in claim 1 wherein said outer frame is connected to said cab with a front wheel assembly, and wherein said outer frame is pivotally connected to said front wheel assembly with means for permitting said rear wheel assembly to horizontally pivot about said front wheel assembly.

5. The trailer as recited in claim 1 further comprising means slidably coupled to said outer frame and extending outward from said inner frame for preventing said outer frame from flexing outward when said trailer is moved.

6. The trailer as recited in claim 1 wherein said inner frame is pivotally connected to the outer frame with a pin extending transversely between said left and right side rails.

7. A low profile dolly trailer comprising:
an elongated first frame having one and another ends and supported adjacent said one end by a first trailer and supported adjacent said another end by an axle assembly;
a second elongated frame having one and another ends pivotally connected adjacent said one end thereof to said first frame between said axle assembly and said first trailer, said second frame being supported about said another end thereof by a second trailer; and
said axle assembly having a first wheeled axle extending through said second frame.

8. The trailer as recited in claim 7 wherein said second frame includes an opening; wherein said axle extends through said opening; wherein said opening is shaped to allow said second elongated frame to pivot about said first frame; and wherein said first frame is pivotally connected to said second frame.

9. The frame as recited in claim 7 further comprising a bolster mounted on said second frame substantially above said axle, said bolster being operative to support a truss.

10. The trailer as recited in claim 7 wherein said second frame includes an opening having walls which completely surround the axle.

11. The trailer as recited in claim 10 wherein said walls are spaced apart from said axle to permit said axle to travel vertically in said opening about said second frame.

12. The trailer as recited in claim 7 wherein said first frame has left and right side rail and wherein said second frame is positioned in-between said left and right side rails.

13. The trailer as recited in claim 7 wherein said first and second frame each have a top surface and wherein the top surface of said first frame is substantially co-planar with the top surface of said second frame.

14. The trailer as recited in claim 13 wherein said second frame is connected to said first frame with a horizontally oriented pin, and wherein said horizontal pin is positioned at a level below the top surface of said second frame.

15. The trailer as recited in claim 7 further comprising:
a vertical plate extending rearward from and connected to said second frame;
a guide assembly connected to an outer side of said first frame, and having a slot to receive said vertical plate; and
said guide assembly having means for permitting said vertical plate to slide vertically up and down in said slot to prevent said second frame from flexing outward and away from said first frame during movement of said trailer.

16. The frame as recited in claim 7 wherein said axle assembly includes a second wheeled axle extending through another opening in said second frame, said second wheeled axle extending in a horizontal plane parallel to and adjacent to said first wheeled axle.

17. A trailer assembly for hauling trusses, beams and material masses with a cab having a trailer, the trailer assembly comprising:
a front and a rear dolly trailer positioned along the path of travel of the cab;
said front dolly trailer comprising:
(a) a first front elongated frame having one and another ends and supported adjacent said one end by the cab trailer and supported adjacent said another end by a front dolly axle assembly;
(b) a second front elongated frame having, first and second ends and pivotally connected at said first end to said first front frame between said cab trailer and said front dolly axle assembly, said second front frame being supported about said second end by a front dolly rear trailer;
(c) said front dolly axle assembly having at least one axle extending through an opening in the second front frame;
(d) a front bolster mounted on said second front frame for supporting a front portion of the material mass; and said rear dolly trailer comprising:
(a) a first elongated rear frame having one and another ends and supported adjacent said one end thereof by a first rear trailer and supported adjacent said another end thereof by a rear dolly axle assembly;
(b) a second rear elongated frame having first and second ends and pivotally connected at said first end to said first rear frame between said first rear trailer and said rear dolly axle assembly, said second rear frame being supported at said second end by a rear dolly rear track;
(c) said rear dolly axle assembly having at least one axle extending through an opening in the second rear frame; and
(d) a rear bolster mounted on said second rear frame for supporting a rear portion of the material mass.

18. The apparatus as recited in claim 17 wherein each of said trailers include a plurality of wheeled axles that support the trailer.

19. The apparatus as recited in claim 17 wherein the second front and rear elongated frames are respectively connected to the first front and rear elongated frames with a pin, said first front and rear elongated frames and said second front and rear elongated frames each having planar top surfaces above said front and rear dolly axle assemblies, respectively; and wherein said planar top surfaces of said first frames are substantially co-planar with said planar top surfaces of said second frames.

20. The apparatus as recited in claim 17 wherein each of said opening are completely surrounded by walls, and wherein said axles extend between the walls in the second frame.

* * * * *